United States Patent Office 3,439,474
Patented Apr. 22, 1969

3,439,474
METHOD FOR HYDROGEN SEPARATION AND PURIFICATION
David L. McKinley, Nitro, W. Va., assignor to Union Carbide Corporation, a corporation of New York
No Drawing. Continuation of application Ser. No. 508,549, Nov. 18, 1965. This application Aug. 17, 1967, Ser. No. 661,464
Int. Cl. B01d 53/22
U.S. Cl. 55—16
1 Claim

ABSTRACT OF THE DISCLOSURE

A method for separating hydrogen from gas mixtures containing hydrogen according to a permeation technique in which there is used a hydrogen diffusion barrier foil consisting of an alloy of not less than 37.5 to not more than 42 weight percent copper and the rest palladium.

---

This application is a continuation of application Ser. No. 508,549, filed Nov. 18, 1965, and now abandoned which is in turn a continuation-in-part of application Ser. No. 264,016, filed Mar. 11, 1963, and now abandoned.

The present invention relates to the separation and purification of hydrogen gas from multicomponent gas mixtures containing hydrogen and other gases, in accordance with gas permeation techniques and, more particularly, to a novel hydrogen separation method which comprehends the diffusion of hydrogen through a permeation barrier made from an alloy of palladium and copper.

It has long been known that certain selected component gases comprised in multicomponent gas mixture can be separated out of the mixtures by directing respective streams of the mixtures against barriers which are permeable to a particular selected component gas but impermeable to other gases and collecting the respective selected component gases at the barrier sides opposite the sides against which the streams are direct. Such processes are performed most effectively at elevated temperatures. It is known that palladium is permeable to hydrogen and impermeable to other gases. Illustrative of the fundamental technique of hydrogen separation through palladium barriers is the teaching found in U.S. Patent No. 1,174,631 to Snelling. Thus, by directing a multicomponent gas stream including hydrogen against a thin sheet or film of palladium maintained at an elevated temperature, the hydrogen can be selectively separated and collected in a high purity state at the downstream side of the barrier.

High purity hydrogen in large quantities is required in many industrial chemical production processes and, presently, in national defense work. Procurement of high volume hydrogen supplies of adequate purity at reasonable cost has long been a matter of concern to industry. While not conclusively proven to date, the existing theory respecting the transfer of hydrogen by diffusion through these hydrogen-specific palladium barriers is that the molecular hydrogen, in whatever gas mixture applied to a palladium barrier surface, dissociates into atomic hydrogen upon contacting the palladium and diffuses through interstices of the palladium metal lattice structure. Experimental work indicates that the rate of hydrogen transfer through the permeation barriers takes place generally in accordance with the relationship:

$$\text{Rate of } H_2 \text{ transfer} = \frac{DK}{t} PA$$

where:

$P$ = hydrogen pressure differential across the barrier
$A$ = barrier surface area
$t$ = barrier thickness
$D$ = diffusion coefficient for hydrogen through the barrier
$K$ = solubility constant for hydrogen in the barrier.

The bearing of temperature on this relationship is taken into account in the respective values for $D$ and $K$ which vary with temperature, and the product $DK$ is conventionally related as the barrier's permeability.

Commercial scale production of high purity hydrogen by the permeation techniques has long been a goal of the gas processing industries. Such processes, however, have been severely hampered by the high cost of the palladium barriers in relation to their useful life and productivity. While hydrogen of very high purity can be obtained by this known method of selective diffusion through palladium barriers, present apparatus limitations, due to the high cost of palladium metal and the low productivity or throughput rates of available barrier equipment, militate against commercial practicality of this hydrogen production method. Palladium barrier diffusers have thus heretofore been limited generally to laboratory and other special uses where relatively small quantities of hydrogen are produced. Use of the method of selective diffusion of hydrogen through hydrogen-permeable palladium barriers on a commercial scale would be highly desirable if some of the more salient difficulties attending the use of palladium barriers could be overcome.

A particular problem concerns the production of effectively thin and sufficiently strong palladium barriers. Until very recently, it has not been possible, according to conventional metal working techniques, to form suitably sized (in area) palladium sheets or foils less than one mil thick, or for that matter, even in the order of one mil thick. Since the rate of transfer of hydrogen through palladium is inversely proportional to the palladium thickness, thinner foils provide for higher throughput or permeation rates and permit employment of relatively low flow-sustaining pressure differentials across the barriers. Recent improvements in metal working techniques permit the production of palladium foils of thickness of the order of one-half mil but these are limited to relatively small uniform thickness areas. As to the desideratum of even thinner foils, for example of the order of one-tenth mil thick, the metal working art has been unable to provide as much as even a one square foot area of palladium foil which, during use in a diffuser, can be maintained for a reasonable period of time free from the occurrence of minute orifices, dendritic holes and cracks and other physical distortions occasioned by routine temperature cyclings attending the permeation process.

Efforts to overcome the physical limitations attending the use of pure palladium diffusion barriers have led researchers to investigate the possibilities of palladium alloys as diffusion barrier materials. It is clear from inspection of the above hydrogen transfer rate relationship that an ideal alloy substitute for pure palladium should, in addition to meeting the main requirement of enhanced strength and physical stability under operational temperature cycling, be one having a permeability or $DK$ product at least as great and preferably greater than that of pure palladium. A satisfactory alloy substitute may well be one having a lesser $DK$ product than that of pure palladium but which exhibits some other desirable characteristics over palladium, such as for example lower cost or greater strength and temperature shock resistance. U.S. Patent No. 2,773,561 to Hunter teaches that hydrogen diffusion barriers made from palladium alloyed with from 10 to 50 weight percent silver yield higher permeability than pure palladium barriers but indicates that the reason for this phenomenon is not fully understood. Experimental work indicated, however, that while increased permeability resulted with the use of silver-palladium alloy barriers according to Hunter, the expansion and contraction of these barriers under routine temperature cycling attending the starting up and shutting down of diffuser apparatus caused these barriers to wrinkle or buckle and alternately to crack or tear, rendering them unsuitable for use in commercial scale operations.

With this then being the state of the art, the experimental work which led to the present invention was undertaken with the objective of providing an improved hydrogen diffusion system, incorporating a diffusion barrier made of an alloy of palladium which would yield practical permeability and physical strength.

ment and by direct measurement using a mounted dial gauge micrometer device accurate to ±0.01 mil. The foils were supported on porous stainless steel substrates 1/16" thick. The tests were performed in laboratory scale diffusion apparatus, the elements of which are within the ken of persons familiar with the art. The barrier surface area contacted was 0.0029 square feet and the test gas used was cylinder hydrogen having a purity of about 99 percent. Permeability of each barrier tested was measured at a temperature of 350° C. and at two pressure levels scil. 75 p.s.i.g. and 300 p.s.i.g. The results of these tests are shown in Table I below.

TABLE I

| Run No. | Barrier foil composition (wt. percent) | | Barrier foil thickness, mils | | Permeability | | | |
|---|---|---|---|---|---|---|---|---|
| | | | | | Hydrogen transfer rate at 75 p.s.i.g. upstream pressure, 0 p.s.i.g. downstream pressure | | Hydrogen transfer rate at 300 p.s.i.g. upstream pressure, 0 p.s.i.g. downstream pressure | |
| | Nominal | Actual | Nominal | Actual | Measured (s.c.f.h.) | S.c.f.h. (mil) (sq. ft.) | Measured (s.c.f.h.) | S.c.f.h. (mil) (sq. ft.) |
| 7 | 100% Pd | 100% Pd | 1 | 1.12 | 0.142 | 55 | 0.433 | 167 |
| 14 | 10% Ag, 90% Pd | 10.29% Ag, 90.00% Pd | 1 | 1.05 | 0.260 | 94 | 0.811 | 294 |
| 14 (repeat) | 10% Ag, 90% Pd | 10.64% Ad, 89.36% Pd | 1 | 1.03 | 0.23+ | 82+ | | |
| 1 | 27% Ag, 73% Pd | 27.18% Ag, 73.05% Pd | 1 | 0.92 | 0.298 | 95 | 0.757 | 240 |
| 13 | 40% Ag, 60% Pd | 40.05% Ag, 59.97% Pd | 1 | 0.93 | 0.113 | 36 | 0.254 | 82 |
| 12 | 52% Ag, 48% Pd | 52.30% Ag, 47.91% Pd | 1 | 1.24 | 0.012 | 5.1 | 0.027 | 11.6 |
| 11 | 80% Ag, 20% Pd | 80.25% Ag, 20.09% Pd | 1 | 1.05 | 0.000 | 0 | 0.000 | 0 |
| 6 | 5% Au, 95% Pd | 4.9% Au, 93.7% Pd | 1 | 1.01 | 0.184 | 64 | 0.514 | 179 |
| 2 | 20% Au, 80% Pd | 20.3% Au, 78.1% Pd | 1 | 1.02 | 0.159 | 56 | 0.462 | 162 |
| 5 | 40% Au, 60% Pd | 39.7% Au, 60.6% Pd | 1 | 0.90 | 0.082 | 25.4 | 0.229 | 71 |
| 4 | 55% Au, 45% Pd | 54.6% Au, 44.8% Pd | 1 | 1.00 | 0.017 | 5.9 | 0.046 | 15.9 |
| 3 | 0.5% B, 99.5% Pd | 0.5% B, 99.5% Pd | 3 | 2.87 | 0.058 | 57 | 0.161 | 159 |
| 8 | 10% Cu, 90% Pd | 9.8% Cu, 90.1% Pd | 1 | 0.97 | 0.093 | 31 | 0.246 | 82 |
| 9 | 40% Cu, 60% Pd | 38.7% Cu, 60.1% Pd | 1 | 1.03 | 0.208 | 74 | 0.506 | 180 |
| 10 | 100% Ni, 90% Pd | 9.8% Ni, 90.6% Pd | 1 | 1.05 | 0.034 | 12.3 | 0.089 | 32 |

Another object of the present invention is to provide a hydrogen separation material which, when formed as a barrier foil and held securely in place against a supporting substrate by a fixed peripheral frame or the like, will undergo only minimal overall expansion and contraction in operations involving routine temperature cycling.

In general, the method of my invention comprehends directing a stream of a multicomponent gas mixture containing hydrogen and at least one other gas to a proximal side of a gas diffusion barrier consisting essentially of an alloy of palladium and from about 30 to about 60 weight percent copper, said alloy having a metallographic crystalline structure which is at least partially body-centered, converting the hydrogen of the mixture into a transportable state for diffusion through the barrier, diffusing the converted hydrogen through the barrier to a distal side thereof, reconverting said hydrogen to its original state at said distal side of said barrier and collecting the hydrogen after its reconversion.

The ensuing disclosure describes my invention with greater particularity and sets forth the details of experimental work performed in connection with the invention.

In order to develop further general information on the permeability characteristics of alloys of palladium, binary alloys of silver-palladium, gold-palladium, copper-palladium, and nickel-palladium were investigated as diffusion barriers. The alloys tested were in the form of nominally 1 mil thick foils. The actual foil thicknesses which are tabulated were determined both by weight-area measurement and by direct measurement using a mounted dial In the table, s.c.f.h. means standard cubic feet per hour, referred to atmospheric pressure.

In the series of tests according to Table I above, the diffusion cell temperature was held to within ±½° C. of 350° C. throughout all runs and the upstream pressure was held to within ±0.5 p.s.i.g. A run at any one set of conditions was assumed to be finished when the measured hydrogen diffusion rate remained constant within ±0.001 s.c.f.h. for a period of three to four days. Before and after each test run, leak tests were made with nitrogen to confirm the physical integrity of the barriers.

The most striking fact evinced by the data from these tests was the unexpected increased permeability of the tested palladium-40 weight percent copper alloy. An examination of the tabulated data shows that the permeability of this binary alloy of copper-palladium is in the order of 1¼ to 1½ times that of pure palladium under similar operating conditions.

Further study of the copper-palladium alloy was indicated.

Further experiments were undertaken to evaluate the hydrogen permeability characteristics of palladium alloys of copper at various weight percentages. The experimental techniques and test apparatus were the same as those described above in connection with the investigations which produced the Table I data. The results of these tests are tabulated in Table II below and the table also includes some of the Table I runs for purposes of comparison.

TABLE II

| Run No. | Barrier foil composition (wt. percent) | | Foil thickness (mils) | | Permeability | | | |
|---|---|---|---|---|---|---|---|---|
| | | | | | Hydrogen transfer rate at 75 p.s.i.g. upstream pressure, 0 p.s.i.g. downstream pressure | | Hydrogen transfer rate at 300 p.s.i.g. upstream pressure, 0 p.s.i.g. downstream pressure | |
| | Nominal | By analysis | Nominal | Actual | Measured (s.c.f.h.) | S.c.f.h. (mil) (sq. ft.) | Measured (s.c.f.h.) | S.c.f.h. (mil) (sq. ft.) |
| 8 | 10% Cu, 90% Pd | 9.69% Cu, 89.61% Pd | 1 | 0.97 | 0.093 | 31 | 0.246 | 82 |
| 21 | 30% Cu, 70% Pd | 29.75% Cu, 70.32% Pd | 1 | 1.02 | 0.015 | 5.3 | 0.040 | 14.1 |
| 24 | 37.5% Cu, 62.5% Pd | 37.35% Cu, 62.50% Pd | 1 | 1.00 | 0.138 | 48 | 0.382 | 132 |
| 9 | 40% Cu, 60% Pd | 39.90% Cu, 60.02% Pd | 1 | 1.03 | 0.208 | 74 | 0.506 | 180 |
| 25 | 42% Cu, 58% Pd | 42.57% Cu, 57.45% Pd | 1 | 0.96 | 0.096 | 32 | 0.240 | 80 |
| 20 | 45% Cu, 55% Pd | 44.20% Cu, 55.58% Pd | 1 | 1.06 | 0.032 | 11.7 | 0.082 | 30 |
| 19 | 55% Cu, 45% Pd | 54.50% Cu, 45.55% Pd | 1 | 0.95 | 0.001 | <1 | 0.005 | 1 |
| 18 | 60% Cu, 40% Pd | 59.15% Cu, 40.55% Pd | 1 | 0.96 | 0.000 | 0 | 0.000 | 0 |
| 17 | 80% Cu, 20% Pd | 78.92% Cu, 20.88% Pd | 1 | 0.88 | 0.000 | 0 | 0.000 | 0 |
| 16 | 90% Cu, 10% Pd | 89.76% Cu, 10.26% Pd | 1 | 0.92 | 0.000 | 0 | 0.000 | 0 |
| 7 | 100% Pd | 100% Pd | 1 | 1.12 | 0.142 | 55 | 0.433 | 167 |
| 1 | 27% Ag, 73% Pd | 27.18% Ag, 73.05% Pd | 1 | 0.92 | 0.298 | 95 | 0.757 | 240 |

The results of this series of tests and other tests show that the permeability of palladium per se progressively decreases as additional amounts of copper are alloyed with palladium until at approximately 30 weight percent copper the alloy has only 10% of the permeability of pure palladium. In the compositions between 30 weight percent and 40 weight percent copper, however, the permeability increases rapidly and at 40 weight percent copper, the alloy has a permeability of 1½ to several times greater than that of pure palladium at low hydrogen partial pressures and about 1¼ to 1½ times that of pure palladium at higher pressure hydrogen partial pressures. Above 40% copper, as additional copper is alloyed with the palladium, the permeability begins to decrease. At approximately 45 weight percent copper, the permeability is only about ⅓ that of pure palladium. At 55 weight percent copper the permeability is very low and at 60 weight percent copper and above the permeability is practically zero.

The data from these experiments, when viewed in the light of published data on the metallographic cubic structure of copper palladium alloys (see Metals Handbook, supra, p. 1201) indicated that the increased permeability of the copper palladium alloy in the 40 weight percent copper area was attributable to the aforementioned crystalline arrangement of this alloy scil. the crystalline structure was "ordered," i.e. body-centered at least partially. In respect of the binary alloys of copper and palladium, face-centered crystals are said to be in α-phase and body-centered crystals are said to be in β-phase in the terminology of the metallurgical arts. The diagram at page 1201 of the Metals Handbook, supra, shows that the crystalline structure of binary alloys of copper and palladium are partly face-centered and partly body-centered when copper is present in the range of from about 31 to about 41 weight percent; that the structure is wholly β-phase or body-centered when copper is present in the range between about 41 and 51 weight percent; and that the structure is again partly face-centered and partly body-centered when copper is present in the alloy in the range from about 51 to about 60 weight percent. The published data also indicates that below 30 and above 60 weight percent copper and at temperatures above 600° C., no ordered body-centered cubic crystalline structure in the copper-palladium binary alloys can be expected.

In order to obtain additional proof that the permeability of the copper-palladium binary alloys was dependent upon an ordered crystalline structure in the barrier foils investigated, the effect of temperature on the hydrogen permeability of (i) pure palladium and (ii) a palladium alloy containing 40 weight percent copper was measured over a temperature range of from 100° C. to 550° C. The test conditions were generally as described hereinabove. The foils tested were supported on ⅟₁₆ inch thick porous stainless steel substrate plates and were nominally 1 mil thick with a working surface area of 0.0029 sq. ft. By analysis the palladium foil was determined to contain 99.9% pure palladium and copper-palladium alloy foil was found to contain 39.7% copper and 60.3% palladium. Cylinder hydrogen at a pressure differential of 75 p.s.i.g. across the barriers was used as source gas. The results of these temperature tests are set forth below in Table III.

TABLE III

| Temperature (° C.) | Palladium | | | 40% copper, 60% palladium | | |
|---|---|---|---|---|---|---|
| | Measured (s.c.f.h.) | (S.c.f.h.) (mil) (Sq. ft.) | Length of time at temp. (days) | Measured (s.c.f.h.) | (S.c.f.h. (mil) (sq. ft.) | Length of time at temp. (days) |
| 100 | 0.009 | 3 | 2 | | | |
| 150 | 0.076 | 29 | 4 | 0.006 | 2 | 4 |
| 200 | 0.078 | 30 | 3 | 0.073 | 23 | 11 |
| 250 | 0.092 | 35 | 6 | 0.179 | 56 | 4 |
| 300 | 0.126 | 48 | 5 | 0.233 | 72 | 8 |
| 350 | 0.157 | 60 | 16 | 0.261 | 81 | 12 |
| 400 | | | | 0.294 | 91 | 10 |
| 450 | 0.228 | 86 | 8 | 0.275 | 85 | 4 |
| 500 | | | | 0.159 | 49 | 2 |
| 550 | 0.333 | 126 | 6 | 0.068 | 21 | 1 |

Comparison of these data of Table III with the diagram on page 1201 of the Metals Handbook, supra, shows very clearly that the temperature range at which the copper-palladium alloy foil begins to suffer decreased permeability is also the temperature range at which the ordered condition (either α+β-phase, β-phase or both) begins to revert to random crystalline structure.

In order to evaluate the copper-palladium alloy generally for its thermal shock resistance test strips of pure palladium and an alloy of 40 weight percent copper-60 weight percent palladium were prepared. Each strip was 1 mil thick, 1 inch wide and 4 inches long. The strips were placed in a test bomb which was pressurized with hydrogen to 300 p.s.i.g. and then heated to 350° C. The foil test strips were held at this condition for three days and then given permeability tests. Permeability of the copper-palladium alloy strip was, as expected, in the order of from 1¼ to 1½ times as great as the palladium. X-ray diffraction measurements indicated that the copper-palladium alloy crystalline structure was wholly β-phase or ordered to the highest permeability condition. The test strips were next cycled from room temperature to 350° C. ten times over a period of four days in a 300 p.s.i.g. hydrogen atmosphere. At the end of this time, the strips were extracted and examined. The palladium strip was severely wrinkled and distorted. The copper-palladium alloy strip had retained its original shape and texture without suffering any discernible physical changes.

In viewing all of the data cumulatively, it is concluded not only that a 40 weight percent copper-60 weight percent palladium alloy foil is a superior substitute for palladium foil-hydrogen diffusion barriers but that any binary alloy of palladium and from about 30 to about 60 weight percent copper is an effective hydrogen diffusion barrier as long as the alloy is characterized by having an at least partially body-centered crystalline structure. From the known crystalline structure characterics of palladium-copper alloys of varying composition it is known that this at least partially body-centered or ordered crystalline structure condition does not obtain at temperatures above 600° C. or when the alloy contains less than 30 or more than 60 weight percent copper.

Following the aforedescribed experimental work, comparison tests of palladium barriers and 40 weight percent copper-60 weight percent palladium alloy barriers were conducted on larger scale apparatus. The diffusion barrier foils used were 1 mil thick, generally rectangular in shape and were arranged on back-to-back porous iron substrates separated by perforated plates to define a sandwich-like structure or "drum" having connecting interior voids. Each such assembly was held together by a frame member which defined a leak-tight edge around the outwardly facing barrier foils. Several drums were arranged in stacked spaced relationship in an enclosed chamber. Hydrogen collection conduits were connected through the respective frames into each of the spaces between the back-to-back barriers and manifolded out through the enclosed chamber's walls. A by-product gas source containing hydrogen, methane and other gas constituents was fed continuously into the chamber after preheating and gross filtering by conventional means and high purity hydrogen collected, measured, analyzed and vented. The working surface of each barrier foil was approximately 1.2 square feet or 2.4 square feet per drum and the palladium and copper-palladium alloy foils were tested concurrently in stacks of four drums for each type of foil. Over operating pressures of from 100 to 200 p.s.i.g. and temperatures of from 350° C. to 450° C. the relative permeability of the copper-palladium alloy foil barriers was found to be about 1¼ times as great as that of the pure palladium foils for continous operating periods of up to several months. The barriers were also examined after each shut-down and the copper-palladium barriers were found to exhibit no discernible distortion or change in contrast to the pure palladium barriers which wrinkled and in some instances cranked as expected.

From the foregoing disclosure it will be apparent to persons familiar with the art that I have invented an improved method and apparatus for the separation and purification of hydrogen from gas mixtures containing hydrogen and at least one other gas or from multicomponent gas mixtures containing hydrogen. While, in the preferred form, my invention comprehends the use of hydrogen diffusion barrier foils consisting esentially of an alloy of palladium and about 40 weight percent copper, suitable barriers may also be made from copper-palladium alloys wherein copper is present in from about 30 to about 60 weight percent, the criterion of effective operation being that the crystalline structure of the binary alloy of copper and palladium used is at least partially body-centered or in ordered condition, scil. in $\alpha + \beta$-phase or wholly $\beta$-phase according to recognized metallurgical parlance. That this criterion obtains only at temperatures below 600° C. is borne out both by the literature and by my experiments.

The foregoing disclosure and the description of the method and apparatus the present invention is posed to make for understanding of my concept, experimental work and reduction to practice and should not be construed in any limiting sense, the invention being defined by the scope of the appended claim.

Whmat is claimed is:

1. A method for separating hydrogen from a gas mixture containing hydrogen, which method comprises the steps of directing a stream of the gas mixture to a gas duffsion barrier having a foil layer about 1 mil thick consisting of an alloy of about 40 weight percent copper and the balance palladium, said alloy having an at least partially body-centered metallurgical crystalline structure; converting the hydrogen of the mixture at the proximal side of said foil layer into a transportable state for diffusion through the foil layer of the barrier; diffusing the converted hydrogen through said foil layer to a distal side thereof; reconverting said hydrogen to its original state at said distal side of said foil layer; and collecting the hydrogen after its reconversion while maintaining at the barrier a pressure differential of at least 75 p.s.i.g. and a temperature of about 350° C.

References Cited

UNITED STATES PATENTS

| | | | |
|---|---|---|---|
| 2,824,620 | 2/1958 | De Rosset | 55—16 |
| 3,155,467 | 11/1964 | Yamamoto | 55—158 |
| 3,241,293 | 3/1966 | Pfefferle | 55—158 |

REUBEN FRIEDMAN, *Primary Examiner.*

C. N. HART, *Assistant Examiner.*